A. B. MATTHEWS.
WATER KETTLE.
APPLICATION FILED JUNE 3, 1919.
1,322,714.
Patented Nov. 25, 1919.
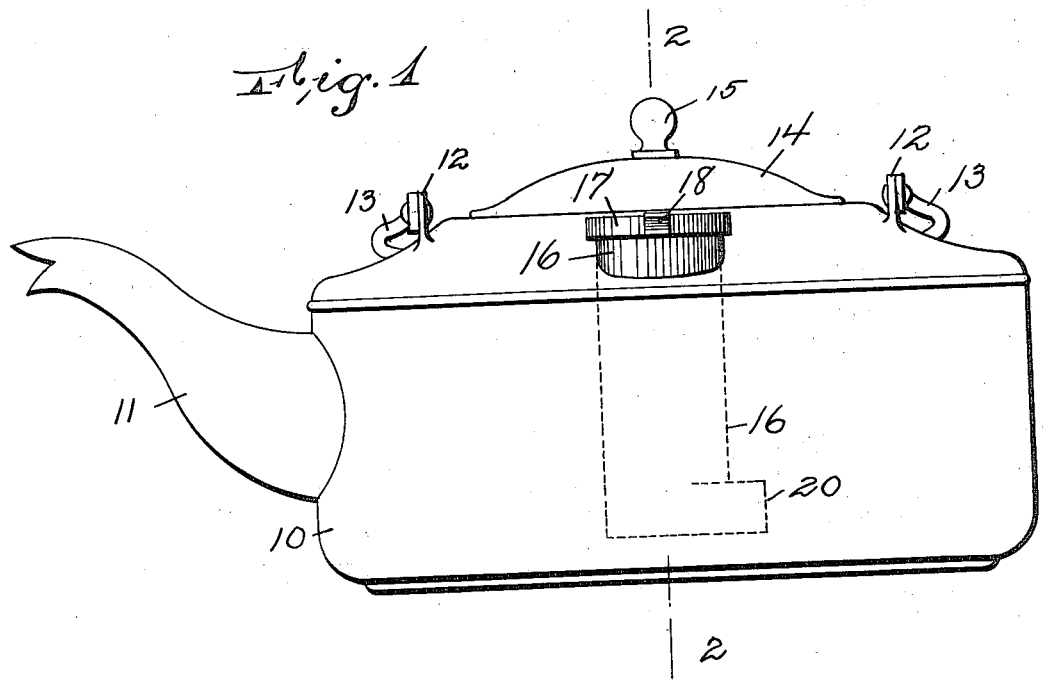
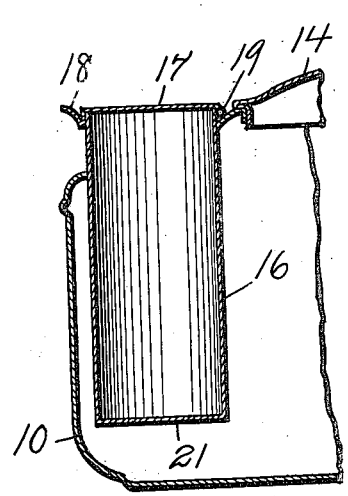
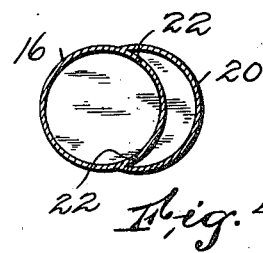
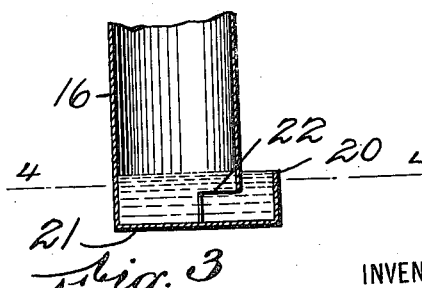
INVENTOR
Arthur B. Matthews,
BY
Wm. H. Canfield
ATTORNEY.

UNITED STATES PATENT OFFICE.

ARTHUR B. MATTHEWS, OF NEWARK, NEW JERSEY.

WATER-KETTLE.

1,322,714.　　　　Specification of Letters Patent.　　Patented Nov. 25, 1919.

Application filed June 3, 1919.　Serial No. 301,480.

*To all whom it may concern:*

Be it known that I, ARTHUR B. MATTHEWS, a citizen of the United States, and a resident of Newark, county of Essex, and State of New Jersey, have invented certain new and useful Improvements in Water-Kettles, of which the following is a specification.

This invention relates to an improved water kettle which is of the ordinary form so far as its outer casing is concerned, but it has, in addition, a filling tube which permits the kettle to be filled with water without removing the main lid from the top, and the lack of this necessity avoids scalding or discomfort from steam emerging from the kettle.

The filling tube is preferably arranged transversely of the main lid, that is, on a line at right angles to the line of the handle and the spout, so that it can be easily held under a faucet while the kettle is being suspended from the handle.

A further object of the invention is to provide a tube of this kind which has a seal or trap at the bottom so that in case of a kettle recently emptied or still partly filled with hot or boiling water, it can be filled through the filling tube and the filling tube does not permit the escape of an appreciable amount of steam, the bottom of the filling tube being constructed so that when the kettle is tilted so as to pour the contents from the spout, the water is not drained from the seal or trap, but is retained in the filling tube.

The invention is illustrated in the accompanying drawing, in which Figure 1 is a side view of a water kettle made according to my present invention. Fig. 2 is a detail section of one side of the kettle and the filling tube, taken on the line 2—2 in Fig. 1. Fig. 3 is a longitudinal section of the bottom part of the filling tube, and Fig. 4 is a section on line 4—4 in Fig. 3.

In said drawing, the water kettle 10 is of any usual type, having a spout 11 and the ears 12 on which the ends of the handle 13 are pivoted, the handle, when raised, being usually in a line with the spout, and when so raised is over the main lid 14. The lid 14 is handled by means of the knob 15 or any other suitable form of finger piece, and when the handle is raised it is directly over the lid, and when the lid is removed the hand holding the kettle is subjected to discomfort and sometimes to scalding from steam emerging from the inside of the kettle, particularly if the kettle is being emptied or has just been emptied, or still has some boiling or very hot water in it.

In order to overcome this difficulty I install a filling tube 16, which extends through the top of the kettle and is preferably arranged transversely of the lid, that is, to one side of the axis defined by the pivots of the handle, although this particular location is not essential, but is preferred because when the kettle is suspended from the hand the filling tube can be placed under a faucet while the kettle is suspended vertically from the hand.

The filling tube is provided with a suitable lid 17, preferably provided with a small projection 18 by means of which it is raised and being pivoted as at 19, the pivot being on the side of the filling tube opposite the outer edge of the kettle, so that the lid 17 of the filling tube swings inward when it is opened. The filling tube extends downward into the kettle for a considerable distance, preferably being extended to a point near the bottom, and is provided on the bottom with a seal or trap, one form of seal being illustrated in the drawing and consisting of a trough 20, the bottom of which is substantially level with the bottom 21 of the tube, the tube having an opening 22, the top edge of which is lower than the top edge of the trough 20. This seal prevents steam from rising in any considerable quantity from the main body of the kettle, and the lid 17 can be opened without danger of scalding.

The trough is usually placed on the side of the filling tube toward the rear of the kettle, so that when the kettle is tilted forward to pour from the spout 11, the water in the seal flows into the tube 16, and when the kettle is righted, again assumes its position, as shown in Fig. 3, where it acts as a seal or trap for the feeding tube.

This particular form of trap or seal is not necessarily used, as modifications can be employed, and it in no way acts to hinder the free and prompt filling of the kettle through the filling tube, the parts being so proportioned that the opening 22 permits sufficient water to flow from the tube into the body portion of the kettle to prevent an overflowing of the filling tube.

With my improved filling tube it is only necessary to remove the main lid for the purpose of cleaning the inside of the kettle, and all filling can be done through the supplemental or filling tube, which is conveniently disposed and does not require the independent handling of a lid.

I claim:

1. In a water kettle, a seal comprising a vertically disposed tube having a lid thereon and having a closed bottom and having an opening in the side at the bottom, and a trough on the outside of the tube at the bottom, the outside wall of the trough being higher than the top edge of the opening and having its two ends joined to the tube.

2. A seal for water kettles comprising a vertically disposed tube having an opening in its side at the bottom, a bottom on the tube, said bottom extending beyond the tube to form the bottom of an outside trough, and side walls on the trough extending from the bottom to a point higher than the top edge of the opening and having the ends joined to the tube.

In testimony that I claim the foregoing, I have hereto set my hand, this 28th day of May, 1919.

ARTHUR B. MATTHEWS.